United States Patent [19]

Vetter et al.

[11] 3,960,391

[45] June 1, 1976

[54] TOE-IN AND OFFSET ADJUSTMENT APPARATUS

[75] Inventors: Craig W. Vetter; John R. Doyle, both of Rantoul; Henry P. Tate, Armstrong, all of Ill.

[73] Assignee: Vetter Design Works, Inc., Rantoul, Ill.

[22] Filed: Jan. 15, 1975

[21] Appl. No.: 541,223

[52] U.S. Cl. ................................................ 280/203
[51] Int. Cl.² ........................................ B62K 27/00
[58] Field of Search ............... 280/203, 96.2 B, 34 R

[56] References Cited
UNITED STATES PATENTS

| 1,215,265 | 2/1917 | Finlay | 280/203 |
| 1,388,387 | 8/1921 | Swan | 280/203 |
| 1,459,387 | 6/1923 | Yeats | 280/203 |
| 1,633,279 | 6/1927 | Scala | 280/203 |

FOREIGN PATENTS OR APPLICATIONS

| 163,285 | 10/1948 | Austria | 280/203 |
| 719,898 | 12/1954 | United Kingdom | 280/203 |
| 827,607 | 2/1960 | United Kingdom | 280/203 |
| 217,754 | 6/1924 | United Kingdom | 280/203 |

Primary Examiner—M. H. Wood, Jr.
Assistant Examiner—Terrance L. Siemens
Attorney, Agent, or Firm—Wegner, Stellman, McCord, Wiles & Wood

[57] ABSTRACT

Apparatus comprising a part of a shock absorbing wheel suspension system of a motorcycle sidecar which is adjustable for securing the sidecar wheel at both different toe-in positions and offset positions. The suspension system includes an elongate swing arm that is pivotally secured to the sidecar frame at one end and carries the wheel assembly at its other end. In one embodiment, the swing arm comprises two elongate members that may be secured together at different relative angular positions corresponding to different sidecar wheel toe-in positions. Means are also provided so that the wheel-carrying one of the two members may be secured at different locations along the length of the other elongate member corresponding to different wheel offset positions. The means provided for securing the members together at different angular positions also functions to secure them together at different relative longitudinal positions. In another embodiment, the apparatus for adjusting the toe-in includes means for securing a swing arm pivot axle to the sidecar frame at different relative angular positions corresponding to the different wheel toe-in positions.

23 Claims, 6 Drawing Figures

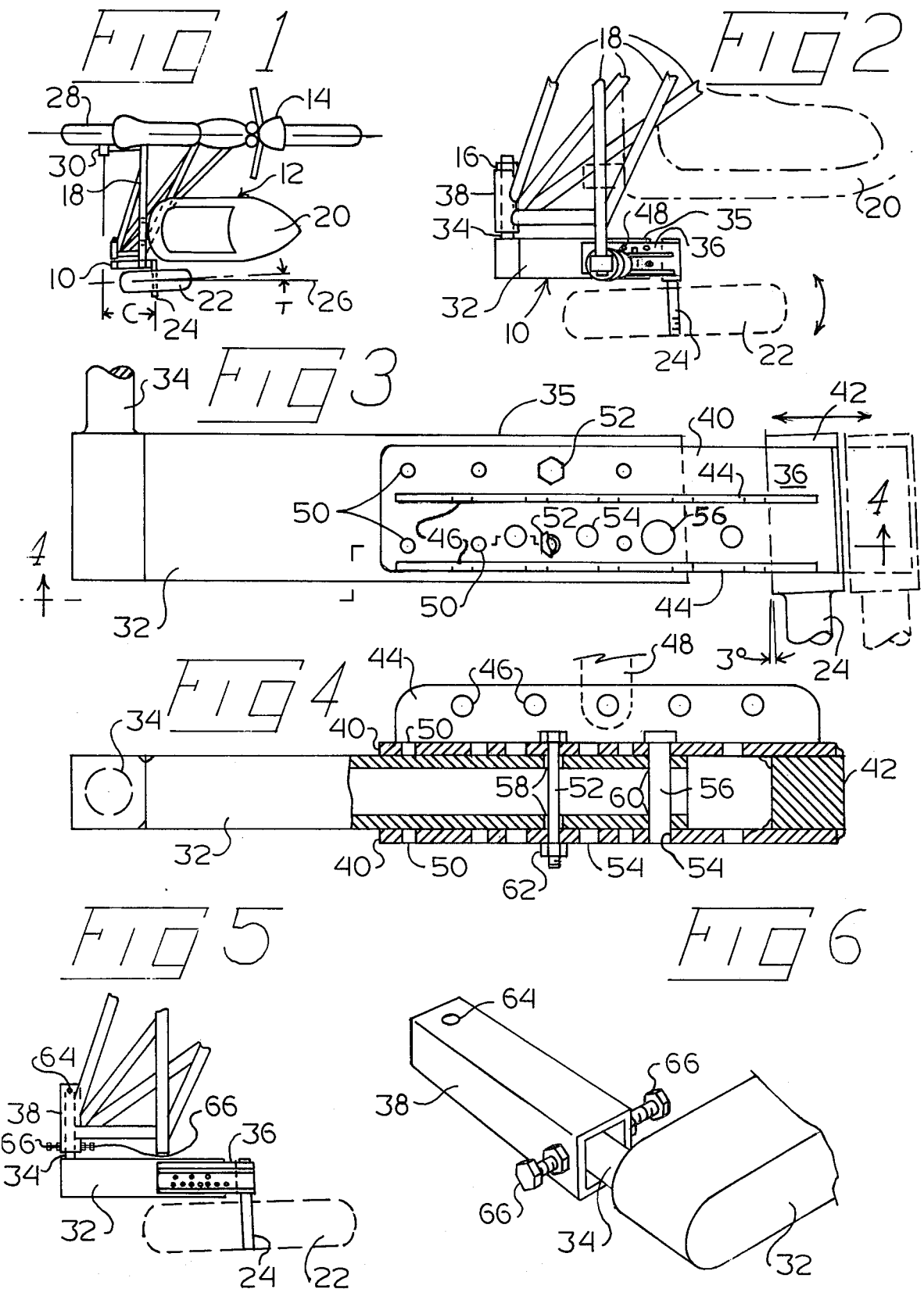

TOE-IN AND OFFSET ADJUSTMENT APPARATUS

BACKGROUND OF THE INVENTION

This invention relates to apparatus for adjustably mounting a wheel assembly to a motorcycle sidecar and, in particular, to such an apparatus which comprises part of a sidecar wheel suspension system and is adjustable to alter both the sidecar wheel toe-in and offset positions.

The advantages including increased load-carrying capacity and improved stability that are provided by a sidecar when attached to a motorcycle to form a combined vehicle, as shown in FIG. 1 have long been enjoyed by motorcycle enthusiasts. The attachment of a sidecar does, however, create some handling difficulties for the motorcycle rider. These handling problems are primarily due to the fact that the combined vehicle, i.e., the motorcycle with the sidecar attached, is asymmetrical both aerodynamically and about its center of gravity. Because the center of gravity is located off to the side of the motorcycle, acceleration and deceleration forces, and gravity forces while the vehicle is moving on an incline, tend to make the vehicle turn to one side or the other. Because of the aerodynamic asymmetry, head-on wind forces likewise tend to make the vehicle turn in one direction or the other rather than continuing in a straight line when so directed. If these forces are not otherwise compensated for, the motorcycle rider himself must continuously apply steering forces in order to make the vehicle travel in a straight line.

These handling difficulties can be alleviated by appropriately directing and positioning the sidecar wheel relative to the motorcycle wheels. Directing the sidecar wheel slightly inward toward the motorcycle by an angular amount T, as illustrated in FIG. 1, reduces the tendency of the vehicle to turn toward the right. A sidecar wheel which is directed inward in this manner is commonly referred to as having toe-in. The handling characteristics of the vehicle may also be improved by positioning the sidecar wheel an appropriate distance C, FIG. 1, from the rear wheel of the motorcycle. This relative longitudinal position of the sidecar wheel relative to the motorcycle wheel is commonly referred to as the sidecar wheel offset position.

For a number of reasons it is desirable to provide means for adjusting one or the other of the toe-in and offset positions of the sidecar wheel. The optimum offset position and amount of toe-in depends upon a number of variable factors including driver weights, passenger weights, road conditions, motorcycle size and weight, etc. Accordingly, a number of different types of apparatus for making such adjustments have been provided.

In U.S. Pat. No. 1,459,387 of Yeats et al., a toe-in adjustment mechanism is shown in which the wheel assembly is carried by an elongate member that is pivotally secured to the frame, referred to as a floating axle. Another member which extends transversely across the sidecar frame is pivotally secured to the wheel-carrying end of the first member, and includes means for securing it in a selected lateral position corresponding to wheel toe-in position. However, no means are shown for adjusting the offset position of the wheel. An offset adjustment mechanism is shown in U.S. Pat. No. 1,633,279 of Scala. There a wheel axle assembly, which traverses the entire sidecar frame, is slidably mounted along the lengths of parallel frame members to different wheel offset positions. However, no means are provided for adjusting the toe-in of the sidecar wheel.

While each of these mechanisms apparently performs the function for which it is intended, none of them is completely satisfactory when viewed with regard to its simplicity, accessibility for adjustment or versatility. A sidecar wheel suspension system is needed for good handling characteristics and rider comfort, and neither the structure of Yeats et al nor that of Scala is readily adaptable for use in a sidecar having such a suspension system which allows the wheel to move relative to the sidecar frame in response to road shock forces. Further, with regard to Scala in particular, adjusting the wheel offset entails the movement of a plurality of parts and loosening and subsequently tightening a plurality of securing elements, some of which are not readily accessible. Moreover, desirably the wheel adjustment apparatus should be capable of providing both wheel toe-in and offset adjustment and not just one or the other, as in the mechanisms discussed above.

SUMMARY OF THE INVENTION

Accordingly, the principal object of the present invention is to provide a sidecar wheel toe-in and offset adjustment apparatus which substantially overcomes the disadvantages of the prior adjustment mechanisms noted above.

More specifically, an object of the present invention is to provide an adjustable wheel mounting apparatus that is adjustable to alter both the wheel toe-in position and the wheel offset position.

An important feature of this apparatus is that it is constructed with minimal parts having one elongate member secured to the sidecar, means for securing the wheel to the elongate member at different angular positions relative thereto corresponding to different wheel toe-in positions and means for securing the wheel to the elongate member at different positions therealong corresponding to different wheel offset positions.

A further feature which minimizes the number of necessary parts is that the means securing the wheel at a selected toe-in position is part of the means securing the wheel at a selected offset position and vice versa.

Another important object of the present invention is to provide an apparatus for adjustably mounting a sidecar wheel at different offset positions which is simply constructed so that it may comprise part of a sidecar wheel suspension system which is movable relative to the sidecar in response to road shock forces being applied to the wheel.

A further important object of the present invention is to provide an apparatus for adjustably mounting a wheel to a sidecar at different toe-in positions which is simply constructed so that it may comprise a part of a sidecar wheel suspension system of the type noted above.

BRIEF DESCRIPTION OF THE DRAWINGS

The foregoing objects and features and advantages of the adjustable sidecar wheel mounting apparatus will be made more apparent, and further features and advantages may be appreciated from the following detailed description of the preferred embodiments taken together with the drawings, in which:

FIG. 1 is a top view of a motorcycle with a sidecar attached thereto employing the adjustable wheel mounting apparatus and illustrating exemplary toe-in and offset positions of the sidecar wheel relative to the motorcycle;

FIG. 2 is a top view of a first embodiment of the adjustable sidecar wheel mounting apparatus employed as a part of a wheel suspension system;

FIG. 3 is an enlarged top view of a part of the apparatus shown in FIG. 2;

FIG. 4 is a side view of a partial section of the adjustable wheel mounting apparatus taken substantially along section line 4—4 of FIG. 3;

FIG. 5 is a top view of a second embodiment of the sidecar wheel mounting apparatus; and FIG. 6 is a perspective view of a part of the adjustable wheel mounting apparatus shown in FIG. 5.

DESCRIPTION OF THE PREFERRED EMBODIMENTS

Referring to FIG. 1, the adjustable wheel mounting apparatus 10 is seen as employed on a motorcycle sidecar 12 attached to a motorcycle 14. The sidecar 12 includes a sidecar frame 18 of interconnected struts to which is secured the adjustable apparatus 10 and which supports and carries a coach 20. Mounted to and carried by adjustable apparatus 10 is a sidecar wheel assembly comprised of a wheel 22 and wheel axle 24. Through use of the adjustable sidecar wheel mounting apparatus 10, the toe-in of wheel 22 (the angle T of wheel 22 relative to an imaginary axis 26 parallel to the normal direction of travel of the sidecar and parallel to the direction of the rear wheel 28 of the motorcycle) may be adjusted. Also, by means of the adjustable apparatus 10, the wheel 22 may be secured at different offset positions defined by distance C between the axle 30 of rear motorcycle wheel 28 and sidecar wheel axle 24.

Referring now to FIGS. 2, 3 and 4, a first embodiment of adjustable wheel mounting apparatus 10 includes first and second elongate members 32 and 36 secured together to form a swing arm 35, which, together with an elongate shock absorber 48 secured between swing arm 35 and a part of the sidecar frame 18 located thereabove, comprises a shock absorbing wheel suspension system. The elongate member 32 is pivotally mounted to the sidecar frame 18 by means of a swing arm axle 34 carried at one end thereof. The second elongate member 36 is secured to first member 32 in lapped relationship therewith adjacent one end thereof and carries the wheel 22 and wheel axle 24 at its other end. Road shock forces applied to the wheel in a generally vertical direction cause the first and second members of swing arm 35 to pivotally move relative to the frame 18 about an axis coincident with swing arm axle 34. This movement is transmitted to the shock absorber to dissipate the force and minimize its transmission to the sidecar frame and coach. Preferably, shock absorber 48 is of the dashpot type and carries a suspension coil spring which force-biases the wheel toward the road to maximize road contact. As will be explained in more detail hereinafter, the second elongate member 36 is both angularly and longitudinally adjustable relative to the first member to respectively effect wheel toe-in and offset adjustment.

For purposes of allowing this shock absorbing motion, the swing arm axle 34 is rotatably mounted within a swing arm axle housing 38 which is secured to the sidecar frame 18. The housing 38 and the swing arm axle 34 lie along a horizontal axis which is substantially normal to the plane of symmetry of the motorcycle and thus pivotal motion of the swing arm 35 is in a substantially vertical plane. One or more bearings (not shown) are provided within the housing 38 to facilitate rotary motion of the swing arm axle 34 and the axle 34 is secured against longitudinal motion within the housing 38 by a nut 16 threaded onto the free end of the axle 34. The end of swing arm axle 34 exterior of the housing is integrally formed with, or rigidly secured to the first elongate member 32.

The construction of the first elongate or swing arm member 32 may be relatively simple. Preferably, the first swing arm member 32 has a rectangular cross section. While it has been found to be convenient to construct member 32 from two square tubular members welded together side by side, it may be of either tubular or solid construction.

The construction of the second elongate or swing arm member 36 is somewhat more complicated than that of the first member 32. The second member 36 comprises a rectangular cross-sectional block 42 to which a pair of plates 40 are respectively secured by weld joints or the like at their forward ends to the top and bottom of the block. Secured to the uppermost plate 40 are two shock absorber mounting brackets 44 used for securing one end of the shock absorber 48 to the swing arm 35. Each one of the brackets 44 has a plurality of spaced mounting holes 46 located along its length which are in alignment with corresponding holes in the other one of the brackets 44. The elongate shock absorber 48 is secured to the upper plate 40 by means of bolts or the like extending through a selected pair of aligned mounting holes 44 and a like hole in a bracket 49 at the lower end of the shock absorber 48 located between mounting brackets 44. The sidecar wheel axle is integrally formed with or secured to block 42 and extends outwardly from the side of the block at an angle which provides a 3° toe-in for the wheel when the elongate second member is aligned parallel with the axis of symmetry of the motorcycle.

The first and second swing arm members are secured together with the forward portion of the first member 32 sandwiched between the rearward portions of the spaced plates 40 of the second elongate member 36. This lapped, mating relationship between the two members tends to secure them together against relative angular motion in the vertical plane of shock absorbing motion while permitting relative angular and longitudinal motion in a plane parallel to the plates. The two swing arm members are secured against relative pivotal motion in a plane parallel to plates 40 by means of bolts 52 and against relative longitudinal motion by means of both bolts 52 and a pivot pin 56, each of which extends through aligned passages in the overlapping portions of the two swing arm members 32 and 36. Specifically, bolts 52 extend through the single pair of passages 58 provided in first swing arm member 32 and through the one pair of the plurality of spaced pairs of passages 50 provided in second swing arm member 36 which are in alignment therewith. Likewise, pivot pin 56 extends through the one passage 60 provided therefor in the first swing arm member 32 and through the one passage 65 of the plurality of passages 54 provided in second swing arm member 36 which is in alignment therewith. A plurality of pairs of passages 50 and associated pin passages 54 are provided spaced along the length of second swing arm member 36 so that adjustments can be made to the wheel offset portions, as will be explained in more detail hereinafter.

The relative dimensions of the bolts 52 and the passages 58 enable adjustment of the wheel toe-in. Passages 54 and 60 have substantially the same inner diameter as the outer diameter of the pivot pin 56, and thus a fixed pivot is established thereby. Likewise, passages 50 have substantially the same inner diameter as the outer diameter of bolts 52. In contrast, the passages 58 in members 32 have a larger inner diameter than the outer diameter of bolts 52, and a clearance is provided thereby between the bolts and the passages. When the bolts 52 are loosened, but not removed, this clearance permits the plates 40 to be moved about the pivot pin 56 to alter the sidecar wheel toe-in. The toe-in may be adjusted to be slightly greater or lesser than the 3° toe-in established when the first and second members are in direct alignment. When the adjustment has been made, nuts 62 are tightened onto the bolts 52, thus rigidly securing the first and second members in the selected relative angular position corresponding to the desired toe-in.

Offset adjustment is achieved by removing the bolts 52 and the pivot 56, and sliding the plates 40 longitudinally forward or backward along the member 32 until the desired offset has been achieved with passages 50 and 54 in alignment with the passages 58 and 60, respectively. Thereupon, the bolts 52 and the pivot 56 are reinserted, the toe-in adjustment is reestablished or changed, and the outer plates 40 are once again secured by the bolts to the member 32. Thus, both toe-in and offset adjustments can be made in a single operation. After a change in the offset position, the shock absorber may be realigned vertically if needed, securing it to another pair of holes 46 on the mounting bracket.

Another embodiment of the adjustable wheel mounting apparatus is seen in FIGS. 5 and 6. In this embodiment, with regard to the relative movement of parts to effect the toe-in adjustment, the swing arm axle 34 and the first swing arm member 32 correspond to the second swing arm member 36, and the swing arm axle housing 38 corresponds to the first swing arm member 32 in the first embodiment. The swing arm axle is adjustably secured in the swing arm axle housing 38 by a pivot member 64 at one end and set screw 66 at the other end. The swing arm axle 34 is rotatably mounted in a bearing (not shown) located in the end of member 32. Alternatively, the swing arm axle could be carried in a bearing which itself is mounted for pivotal movement within the swing arm axle housing 38, thereby eliminating the need for relative rotation between the swing arm axle and the swing arm.

In any event, by withdrawing the set screws 66 outwardly away from the center of the housing and pivotally rotating the swing arm about the pivot 64, the toe-in adjustment may be accomplished. After the proper setting has been made, the set screws 66 are tightened against opposite ends of the swing arm axle 34 to secure together the swing arm and the swing arm axle housing in a relative angular relationship corresponding to the desired toe-in.

We claim:

1. Apparatus for adjustably mounting a wheel to a motorcycle sidecar, comprising:

a substantially horizontal elongate rigid member secured to the sidecar and extending in the general direction of sidecar travel;

toe-in adjustment means for securing said wheel to the elongate member at different fixed angular positions relative thereto corresponding to different wheel toe-in positions; and offset adjustment means for securing said wheel to said elongate member at different fixed positions therealong corresponding to different wheel offset positions.

2. The adjustable wheel mounting apparatus of claim 1 in which said wheel is mounted for pivotal motion about a pivot axis located along said elongate member and in a plane substantially transverse thereto.

3. The adjustable wheel mounting apparatus of claim 2 including a second elongate member carrying said wheel and wherein said toe-in adjustment means includes means for mounting said second member for pivotal motion about the pivot axis and means for securing said second member at different angular positions relative to the first-mentioned elongate member.

4. The adjustable wheel mounting apparatus of claim 3 wherein said offset adjustment means includes means for establishing said pivot axis at different relative locations along the length of one of the first-mentioned and second members.

5. The adjustable wheel mounting apparatus of claim 4 in which said pivot axis establishing means includes a pivot member carried by one of said first and second elongate members and means carried by the other of said elongate first and second members for pivotally securing said other elongate member to the pivot member at different locations along the length of the other elongate member.

6. The adjustable wheel mounting apparatus of claim 5 in which said offset adjustment means and said toe-in adjustment means include means spaced from said pivot member along the length of said other elongate member for releasably securing said elongate first and second members together at different relative angular positions and at different locations therealong respectively.

7. The adjustable sidecar wheel mounting apparatus of claim 1 in which the toe-in adjustment securing means is a part of the offset adjustment securing means and vice versa.

8. The adjustable sidecar wheel mounting apparatus of claim 1 in which said elongate member comprises a part of a shock absorbing wheel suspension system which is mounted to the sidecar for motion relative thereto in response to road shock forces encountered by the wheel.

9. In a motorcycle sidecar having a frame, a wheel assembly including a wheel and a wheel axle and a suspension system carrying said wheel assembly and mounted to the frame for movement relative thereto in response to road shock forces applied to the wheel assembly, a sidecar wheel mounting apparatus adjustable to change the toe-in of the sidecar wheel, comprising:

first and second rigid members at least one of which carries said wheel assembly and comprises a part of said suspension system, said wheel-carrying one of said first and second members movable relative to the sidecar frame in the direction of road shock forces;

means for securing the wheel-carrying one of said first and second members to the other one of said members for pivotal motion relative thereto; and adjustment means for releasably holding said first and second members in different relative pivotal positions corresponding to different wheel toe-in positions.

10. The toe-in adjustment apparatus of claim 9 in which both of said first and second members are movable relative to the sidecar frame in the direction of road shock forces.

11. The adjustable toe-in apparatus of claim 9 in which said first and second members are elongate and rigidly secured together in lapped relationship in their elongate direction by said releasable holding means.

12. The adjustable toe-in apparatus of claim 11 in which said first and second members comprise a swing arm and one of said first and second members includes at the end thereof furthest from the wheel assembly means for mounting it to the sidecar frame for pivotal motion about an axis substantially parallel to the wheel axle.

13. The toe-in adjustment apparatus of claim 9 wherein said second member is the wheel-carrying one of said first and second members and said first member is fixedly secured to the sidecar frame and is not movable relative thereto.

14. The toe-in adjustment apparatus of claim 13 in which said first member has an elongate axis and said second member is mounted to the first member for pivotal motion about said axis in response to road shock forces being applied to the wheel assembly.

15. The toe-in adjustment apparatus of claim 14 in which said axis is defined by an axle to which said second member is rotatably mounted at one end thereof, and said securing means includes means for pivotally mounting said axle at the other end thereof to said first member and said adjustment means includes means for releasably holding said axle in different pivotal positions relative to said first member.

16. The toe-in adjustment apparatus of claim 15 in which said adjustment means includes a threaded member carried by said first member and engaging said axle.

17. The toe-in adjustment apparatus of claim 13 in which said second member is elongate and includes means for securing the wheel assembly thereto at different positions therealong relative to said first member.

18. In a motorcycle sidecar having a frame extending in the normal direction of sidecar travel, a wheel assembly, and a suspension system carrying said wheel assembly and movably mounted to the frame, apparatus adjustable for changing the offset position of the sidecar wheel relative to the motorcycle wheels, comprising:

a first member extending in the normal direction of sidecar travel and comprising a part of said suspension system movably mounted to the frame;

a second member comprising a part of said suspension system and including means for carrying said wheel assembly; and means for securing said second member to said first member at different positions therealong in the direction in which said first member extends.

19. The offset adjustment apparatus of claim 18 in which said second member includes means for connecting a shock absorbing member thereto at different locations spaced apart in the elongate direction thereof.

20. The offset position adjustment apparatus of claim 18 in which said first and second members are elongate in said normal direction of sidecar travel and a part of one of said first and second members overlies a part of the other of said first and second members in the elongate direction and said securing means secures said first and second members together at the respective overlapping parts thereof.

21. The offset adjustment apparatus of claim 18 in which said first member is mounted to the sidecar frame for pivotal motion relative thereto in response to road shock forces encountered by the wheel assembly, and one of said first and second members includes means for connecting it to one end of a shock absorbing member, the other end of which is connected to the sidecar frame.

22. The offset adjustment apparatus of claim 21 in which said shock absorber connecting means includes means for connecting said shock absorber at different locations spaced apart from one another along the length of said one of said first and second members.

23. The offset adjustment apparatus of claim 18 including means for mounting said second member at different angular positions relative to the sidecar frame corresponding to different wheel toe-in positions.

* * * * *